Dec. 13, 1932.  J. RAZEK ET AL  1,890,750
METHOD AND APPARATUS FOR SECURING HIGH
AMPLIFICATION IN ELECTRICAL CIRCUITS
Filed Dec. 22, 1930

INVENTORS
Joseph Razek,
Peter J. Mulder.
BY
ATTORNEYS

WITNESS
F. G. Hartman.

Patented Dec. 13, 1932

1,890,750

UNITED STATES PATENT OFFICE

JOSEPH RAZEK, OF UPPER DARBY, AND PETER J. MULDER, OF DREXEL HILL, PENNSYLVANIA

METHOD AND APPARATUS FOR SECURING HIGH AMPLIFICATION IN ELECTRICAL CIRCUITS

Application filed December 22, 1930. Serial No. 503,884.

This invention relates to the amplification of small electrical quantities by means of a circuit comprising one or more audion tubes and is directed more particularly to the provision of specified resistances for audion tube grid circuits whereby maximum amplification, sensitivity and stability may be obtained, permitting the use of a circuit of more than one tube in which the indicating instrument employed may be arranged to respond to the differential effect of an electrical change impressed on the grid of one of the tubes.

In audion tube amplifying circuits of this nature it has heretofore been the practice to select grid resistors by trial and error methods without any particular attention being given to the exact value of the resistance thereof, with the result that the resistors have usually not been well adapted in value to the circuit being employed or to the audion tubes with which it is connected, whereby the attainment of maximum amplification and sensitivity with such circuits has been impossible.

We have found, however, that the degrees of amplification and sensitivity obtainable from a given circuit are dependent upon and bear a determinable relation to the value of the grid resistors employed, and our invention contemplates the employment of grid resistors having values such that maximum amplification and sensitivity may be obtained.

A principal object of our invention, therefore is to provide a method of determining the appropriate value of the grid resistance required to permit a desired degree of amplification and sensitivity to be obtained from a given circuit.

A further object of our invention is to provide a method for determining the grid resistance values which must be employed to yield maximum amplification and sensitivity from a given circuit consistent with a desired degree of stability.

Other purposes, objects and advantages of our invention will hereinafter be more particularly refered to, or will appear from the following description of our invention as it may be utilized in relation to circuits adapted for amplifying small electrical quantities, such, for example, as those derived from photoelectric or other light sensitive cells; in connection with such description reference will be had to the accompanying drawing.

Figure 1:
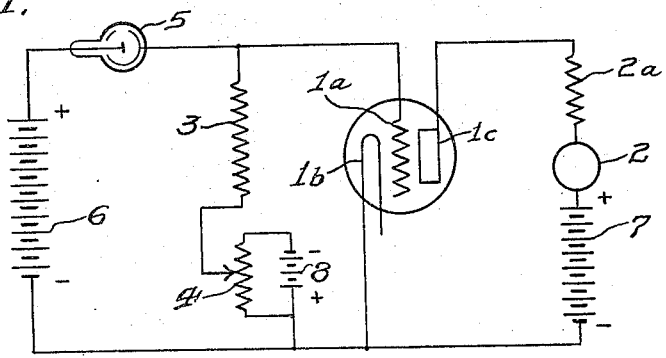
Figure 2:
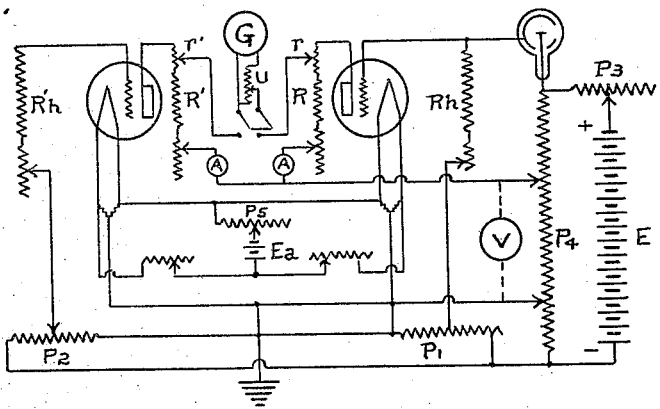
Figure 3:
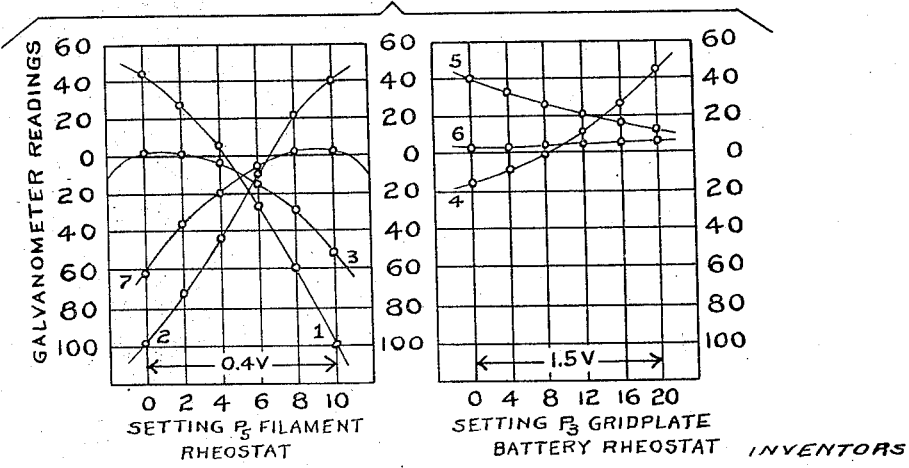

In the said drawing, Fig. 1 is a line diagram showing the usual arrangement of an audion circuit adapted to amplify responses in a photoelectric cell; Fig. 2 is a line diagram showing a compensated audion circuit adapted for similar purposes and embodying certain principles and improvements disclosed in our copending application, Serial No. 498,296, filed November 26, 1930, (abandoned in favor of this application) which is a division of our earlier application, Serial No. 328,835, filed December 27, 1928; Fig. 3 shows examples of curves obtained during the determination of operating points for typical circuits in accordance with the methods of our invention.

Referring now more particularly to the drawing, in Fig. 1 is shown the usual arrangement of an audion tube coupled to some device whose electrical output is to be amplified and measured, for example, a photoelectric cell. The audion tube 1 contains a grid $1a$, a filament or other source of electrons $1b$ and a plate $1c$. The plate circuit comprises merely a meter 2, resistance $2a$, and a plate battery 7. The filament is heated in the usual way. To the grid of the audion is connected the load to be measured, in the circuit shown, a photoelectric cell 5 polarized by the battery 6. In addition, a grid resistor 3 connects the grid to a potential divider 4 so that various values of negative potential can be applied to the grid. It is with the use of the proper value of this grid resistor, and its profound effect on the action of the whole circuit, that our invention is concerned.

In even the most highly evacuated vacuum tubes, some residual gas always remains. When electrons are emitted by the filament and make their way to the plate and when the plate potential is well above the ionization potential of the gases most likely to be present, as is usually the case, some of the residual gas molecules are ionized. The negative electrons so liberated add to the primary electrons from the filament. The positive gaseous ions, however, are attracted to the most negative body within the tube which is the grid, and give up their positive charge to it. Now, a continuous giving up of charge is exactly equivalent to an electric current, if the circuit is closed, as is the case here. But this current, which we call the positive ion grid current to distinguish it from the well known negative grid current which flows when the grid is positive with respect to some part of the filament and with which we are never concerned here, must flow through the grid resistor 3, causing a voltage drop across this resistance. The actual grid potential, therefore, differs from the C bias voltage obtained from the potential divider 4 and battery 8 or their equivalent. Furthermore, in a well insulated tube, we find that the positive ion grid current is exactly proportional to the plate current flowing. This, however, is not absolutely essential, it merely being necessary that the various leakage paths be of a considerably higher resistance than the resistor 3.

By a simple mathematical proof we have shown that this grid current has the effect of increasing the mutual conductance of the audion tube. This proof was published in full in our paper entitled "High grid resistor amplifier" in the Journal of the Optical Society of America and Review of Scientific Instruments, June, 1929, page 466, in which resistance 3, Fig. 1 hereof, and resistances $R'_h$ and $R_h$, of Fig. 2 hereof, are upwards of 1000 megohms for a tube of the type CX-312A.

Furthermore, this same proof shows that there is a definite limit to which the gain in sensitivity, that is, increase in mutual conductance, can be pushed. This can be seen to be the case when the product of the normal mutual conductance G, the grid resistor resistance $R_h$ and the proportionality factor $k$ which is the ratio between the positive ion grid current and the plate current, representative of the degree of vacuum, is equal to 1 plus the product of the plate resistance and the plate to filament conductance. Preferably, the value of the grid resistance is made such that the product $R_h k G$ is from 0.4 to 0.7 since, if it is made up to the limiting value, the circuit is infinitely sensitive and hence unstable. Current amplifications of about 1,000,000 to 10,000,000 and upwards, are obtainable from a single tube without the amplifier becoming unstable.

By solving the equivalent network, we have been able to show that the ratio of the change in plate current to the change in photocell current is given by the following differential equation:

$$\frac{dip}{dix}=\frac{GR_h}{1+\frac{R_h}{R_g}+\frac{R_h}{R_o}-R_h k G}$$

where $ip$ is the plate current in the audion tube $ix$ is the cathode to anode current in the photoelectric cell or the corresponding current in any other source of load to be measured G is the mutual conductance of the tube $R_h$ is the resistance in series with the grid of the tube $R_g$ is the grid to ground resistance over parts of the tube, that is, the leakage resistance of the grid.

$R_o$ is the leakage resistance to the ground of the load being measured $k$ is the proportionality factor between the plate current and the grid positive ion current.

In order that differences of a smaller order of magnitude than the plate current itself can be measured, which in turn makes it possible to measure much smaller differences in the electrical response of the device being measured, the circuit shown in Fig. 2 may be used. This consists of a circuit like that of Fig. 1 interconnected with a similar circuit which may or may not include a second photoelectric cell as desired. Across the tapped points on the plate resistors R, R' is connected a galvanometer G fitted with some form of galvanometer shunt U. The filament circuits are supplied from a common battery $E_a$ with a rheostat $P_5$ in series therewith.

The plate and grid circuits are supplied from a single potential divider $P_4$ across a battery E also fitted with a rheostat $P_3$. The rheostats $P_3$ and $P_5$ may be known and referred to as the compensation rheostats and their function will be explained.

In our said divisional application, Serial No. 498,296, filed November 26, 1930, we state that the tubes will be compensated when the effective mutual conductances are equal, which in turn will be the case when the respective products of the grid resistors, by the mutual conductance, by the ratio of the positive ion grid current to the plate current, for both tubes will be substantially equal. Furthermore, we make these products equal by altering the grid resistors of the tubes until these products are equal and equal to a predetermined value. In actual practice this is done as nearly as possible, but unavoidable changes in the tubes with use, and experimental difficulties in determining the various quantities, have led us to devise a procedure to correct any slight misadjustment in these products.

In our paper entitled "A bridge grid resistor amplifier", published in the Journal of the Optical Society of America and Review of Scientific Instruments, December, 1929, page 390, we have demonstrated mathematically that the circuit shown in Fig. 2 will be stable in spite of battery fluctuations when certain conditions as to the values of tube parameters are met. It is obvious that if the tubes are identical in characteristics, and the grid resistors are properly chosen, the stated conditions will be met, and the circuit will be steady. However, absolute identity of the tube characteristics is difficult, if not impossible, to attain. Consequently, we first determine the value of the grid resistors to be used with each tube so that the products $GR_h k$ for each tube will be equal or as nearly equal as possible. That is, the effective mutual conductances of the tubes are made as nearly as possible.

A slightly more refined procedure would be to make the grid resistors of such value as to make the relation $$\frac{G}{1 - GR_h k}$$

the same for both tubes. As a matter of fact, both procedures give nearly the same value for the grid resistors when tubes of the same general type are used. Furthermore, any slight differences from equality will be eliminated by the method of compensation about to be described.

An essential step in this method consists in supplying the plate and the grid voltages from a potential divider across a common source so that these voltages are always a fixed proportion of the common voltage. Similarly, the two filaments are operated from another common battery. This arrangement reduces from six to two the number of independent conditions to be met in order that the circuit may be steady in spite of battery voltage fluctuations. The resulting two conditions are relatively easy to realize simultaneously.

After the circuit is completely assembled, the two variable portions of the plate resistances are adjusted to make the total plate resistances nearly equal. With the filament rheostats at some arbitrary setting, the grid bias potential dividers, $P_1$ and $P_2$, are adjusted to give the desired plate current in each tube. On closing the switch in the galvanometer circuit, the small galvanometer current which will generally flow due to lack of perfect adjustment, can be balanced out by readjusting either of the grid bias potential dividers. Fine adjustment may be secured by changing the galvanometer tapping points $r$ and $r'$.

By changing the setting of the rheostat $P_5$, filament battery fluctuation is simulated. Curves are drawn of the galvanometer readings against the settings of $P_5$ for various settings of the separate filament rheostats. Points of zero slope are desired, and it is soon evident whether or not that condition is being approached. After such zero slope points have been found, the filament rheostats are set at the readings corresponding to the points, and filament compensation has been accomplished.

The circuit is then tested for plate and grid battery compensation. The precedure is the same as before, except that the curve is plotted with galvanometer readings against the settings of the rheostat $P_3$ in the main battery circuit. If the grid resistors have variable portions, changes in their values can be made until the curve shows a maximum or minimum. As an alternative, the values of the plate resistors R and R' can be changed. It is generally most convenient to make an approximate setting with the grid resistors and the final adjustment by changing the plate resistors.

However, when the grid or the plate resistors are changed, the filament battery compensation has been somewhat upset. Consequently, if the greatest possible degree of stability is desired, the procedure is again repeated until a slight change in either $P_3$ or $P_5$ will leave the galvanometer reading unchanged. Samples of the curves obtained during the determination of the compensation points are shown in Fig. 3. They may have sharp maxima or minima, and a single definite change in voltage may cause a change from a reading on one side of the peak to an equal reading on the other side. For such definite changes the galvanometer gives a kick while the change is being made. The plotted curve shows the reason. In other words, single definite changes in voltage do not establish the compensation condition, but continuously variable rheostats, changed slowly, together with a curve of the readings, will show the desired points of operation.

The value of "$k$" seems to change very slowly with time, in a manner which probably depends upon the use of the tube. Consequently, the compensation settings for the circuit will change and the procedure of finding the best operating points has to be repeated from time to time. However, this process requires only a quarter to a half hour.

A change in "$k$" also alters the voltage sensitivity. For easy recalibration, a definite voltage, taken from a separate cell and a potential divider permanently attached in one of the grid circuits between the potential divider $P_1$ or $P_2$, and the grid resistor may be cut in or out with a switch. Or a more elaborate potentiometer may be substituted for $P_1$ or $P_2$, and a null method may be employed. This is equivalent to a calibration for every reading.

After the operating points for the desired degree of stability have been found, the circuit is ready for use and the actual procedure beyond this point depends upon the use to which the circuit is put.

In our previously mentioned divisional application, we used merely the grid circuit compensation, that is, we adjusted the grid resistors to such value that the effective mutual conductances were the same. This procedure is adequate if care is exercised in selecting tubes so that the other characteristics are identical, that is, the tubes "match".

In this application we extend this procedure to the case where the tubes are not matched precisely. The grid resistors are still chosen to make the effective mutual conductances as nearly alike as possible. The actual operating conditions for stability in the balanced compensated circuit given in Fig. 2 are so involved that they cannot be stated in words, but are given by the two coefficients in the braces in the following equation, taken from our paper "A bridge grid resistor amplifier" (page 397) previously cited. The compensation equation for the circuit is $$K\frac{di_g}{dt} = \left\{\left[\frac{1+Jr-kGR_h}{1+JR-kGR_h}\right]a - \left[\frac{1+J'r'-k'G'R_h'}{1+J'R'-k'G'R_h'}\right]a' - \left[\frac{G(R-r)\beta}{1+JR-kGR_h}\right] + \left[\frac{G'(R'-r')\beta'}{1+J'R'-k'G'R_h'}\right]\right\}\frac{dE}{dt} - \left\{\left[\frac{A(R-r)\gamma}{1+JR-kGR_h}\right] - \left[\frac{A'(R'-r')\gamma'}{1+J'R'-k'G'R_h'}\right]\right\}\frac{dE_a}{dt} = 0$$

where

RG is the galvanometer resistance $\frac{di_g}{dt}$ is the rate of change of galvanometer current with time R is the external plate resistance, first tube
r is the portion of external plate resistance up to balancing point
J is the plate to filament conductance
G is the mutual conductance
A is the filament temperature function
$R_h$ is the grid resistance
k is the factor of proportionality between positive ion grid current and corresponding plate current
$\alpha$ is the ratio of plate voltage to main battery voltage E
$\beta$ is the ratio of "C" bias voltage to main battery voltage E
$\gamma$ is the ratio of filament voltage to filament battery voltage $E_a$
E is the main battery voltage
$E_a$ is the filament battery voltage $K$ is the $\left[RG + (R-r)\left(\frac{1+Jr-kGR_h}{1+JR-kGR_h}\right) + (R'-r')\left(\frac{1+J'r'-k'G'R_h'}{1+J'R'-k'GR_h'}\right)\right]$ Unprimed quantities refer to first tube
Primed quantities refer to second tube.

The compensation technique described determines at what points the two tubes should be operated to satisfy these conditions without actually attempting to calculate the two coefficients in the braces. As the operating points are altered all the terms change slightly, and at the point where the galvanometer current remains stationary for a change in the two voltages, the conditions are met.

In this way, the difficulty of securing precisely matched tubes, and of so precisely determining the proper value of grid resistor, is overcome.

Although the use of a grid resistor in an amplifying circuit is not new, it must nevertheless be noted that the high value of resistor here used and its selection in accordance with the methods of our invention, makes an important alteration in the operation of the circuit, leading to decidedly improved results. For high amplification with a minimum of apparatus, the circuits suggested seem highly suitable. Furthermore, by taking cognizance of the positive ion grid current, it is possible to determine the limitations of a resistance coupled direct current amplifier, and to determine under what conditions the circuit can be made to give reproducible results, checking with predicted values.

Having thus described our invention, we claim and desire to protect by Letters Patent of the United States:

1. A system for obtaining current amplifications upwards of one million comprising a thermionic tube, means for negatively biasing the grid of the tube to such extent that the positive ion current is predominant, and resistance for the grid circuit of the tube having a magnitude of one thousand megohms or upwards.

2. A system for effecting high current amplification comprising a thermionic tube, resistance in the grid-circuit thereof, responsive means for varying the current traversing said resistance, a second thermionic tube substantially similar to said first tube, a deflection instrument connected between the anode circuits of said tubes, and adjustable means for effecting substantial equality between the product of said resistance, times the normal mutual conductance of said first tube times the ratio of the positive ion grid current to the plate current of said first tube, and the product of the grid-circuit resistance of the second tube times its normal mutual conductance times the ratio of its positive ion grid current to its plate current.

3. A system for effecting high current amplification comprising two dissimilar thermionic tubes, a deflection instrument connected between the anode circuits of said tubes, and resistances in the input circuits of said tubes, at least one of which is adjustable through such a range that the ratio of mutual conductance of one tube to unity minus the product of its grid circuit resistance times its mutual conductance times the ratio of its positive ion grid current to its plate current is equal to the same ratio of the mutual conductance, grid circuit resistance, and ratio of positive ion current and plate current of the second tube.

4. In the operation of an amplifier system comprising two thermionic tubes, and an indicating instrument connected between the anode circuits thereof, the method of effecting high currrent amplification which comprises adjusting resistances of the order of 1000 megohms in the grid circuits of the tube to such value that substantial equality is effected between the product of grid resistance of one tube times its normal mutual conductance times the ratio of its positive ion grid current to its plate current and the product of the grid resistance of the other tube times its normal mutual conductance times the ratio of its positive ion grid current to its plate current, and thereafter making small alterations in the operating voltages of each tube to determine those operating points, which give minimum deflection of said instrument for departures therefrom of the order of supply fluctuations.

5. A system for effecting current amplification upwards of one million comprising two thermionic tubes, a deflection instrument between the anode circuits of said tubes, resistances in the grid circuits of said tubes having a value upwards of one thousand megohms, a source of current, a potentiometer resistance in shunt thereto, connections for deriving the plate voltages and grid-biasing potentials for both of said tubes from said potentiometer resistance, and a variable resistance between said potentiometer resistance and said source of current of such value and range of adjustment that said plate voltages and biasing potential are of such value that departures therefrom due to voltage fluctuations of said source have negligible effect upon the readings of said instrument.

6. A system for effecting high current amplifications comprising two thermionic tubes, a deflection instrument connected between the anode circuits thereof, a source of current, a potentiometer resistance in shunt thereto, connections from said resistance to the anodes of said tubes, resistances in shunt to each other and to a portion of said potentiometer resistance, a resistance in the grid circuit of each of said tubes of the order of one thousand megohms and connected to a contact adjustable along one of said shunt resistances, to effect substantial equality between the sensitivity of said tubes, and means for adjusting the flow of current from said source through said potentiometer resistance to obtain operating grid and anode voltages of such value that departure therefrom due to voltage fluctuations of said source have negligible effect upon the readings of said instrument.

7. A system comprising a thermionic tube, an indicating instrument in the output system thereof, a photo-electric cell, and a resistance traversed by the photo-cell current and included in the grid-circuit of said tube having a magnitude of about one-thousand megohms or upwards to effect amplification of said photo-cell current of about one-million or upwards.

8. A system comprising two thermionic tubes, an indicating instrument connected between the output circuits thereof, a resistance in the grid circuit of each of said tubes having a magnitude of about one thousand megohms or upwards, a photo-electric cell whose current traverses one of said resistances, and adjustable means for effecting substantial equality between the product of said one of said resistances times the mutual conductance of the associated tube times the ratio of its positive ion grid current to its plate current and the product of the other resistance times the mutual conductance of the associated tube times the ratio of its positive ion grid current to its plate current.

9. An amplifying system comprising an audion, a plate circuit therefor including resistance, and an input system therefor including resistance connected in a direct-current path between the grid and cathode of said audion, of such magnitude that the product of said grid-circuit resistance times the mutual conductance of the audion times the ratio of positive ion grid current to the plate current approximates but is less than one plus the product of said plate circuit resistance times the plate-to-cathode conductance.

10. An amplifying system comprising an audion, a plate circuit therefor including resistance, and an input system therefore including resistance connected in a direct-current path between the grid and cathode of said audion, of such magitude that the product of said grid-circuit resistance times the mutual conductance of the audion times the ratio of positive ion grid current to the plate current is upwards of .4 and less than 1 plus the product of said plate circuit resistance times the plate-to-cathode conductance.

11. A system for obtaining high current amplification comprising a thermionic tube, means for negatively biasing the grid of the tube to such extent that the positive ion current is predominant, and resistance in the grid circuit of said tube of such magnitude that the product of said resistance, times the normal mutual conductance of the tube, times the ratio of the positive ion grid current to the plate current is from about .4 to .7.

In witness whereof we have hereunto set our hands this 20th day of December, 1930.

JOSEPH RAZEK.
PETER J. MULDER.